(12) United States Patent
Freese et al.

(10) Patent No.: US 6,816,306 B2
(45) Date of Patent: Nov. 9, 2004

(54) MICRO-LENS ARRAY BASED LIGHT TRANSMITTING SCREEN WITH HIGH RESOLUTION AND LOW IMAGING ARTIFACTS

(75) Inventors: Robert P. Freese, Chapel Hill, NC (US); David Reed, Chapel Hill, NC (US); Dale S. Walker, Houston, TX (US)

(73) Assignee: Bright View Technologies Inc., Chapel Hill, NC (US)

( * ) Notice: Subject to any disclaimer, the term of this patent is extended or adjusted under 35 U.S.C. 154(b) by 0 days.

(21) Appl. No.: 10/452,254

(22) Filed: Jun. 3, 2003

(65) Prior Publication Data

US 2004/0008411 A1 Jan. 15, 2004

Related U.S. Application Data

(63) Continuation-in-part of application No. 10/120,785, filed on Apr. 12, 2002, which is a continuation-in-part of application No. 09/521,236, filed on Apr. 5, 2000, now Pat. No. 6,483,612, which is a continuation of application No. 09/060,906, filed on Apr. 15, 1998, now abandoned.

(51) Int. Cl.[7] ........................... G03B 21/60; G02B 27/10
(52) U.S. Cl. ....................................... 359/456; 359/626
(58) Field of Search .............................. 359/455, 456, 359/457, 458, 460, 626, 628

(56) References Cited

U.S. PATENT DOCUMENTS

| | | | |
|---|---|---|---|
| 3,893,748 A | * 7/1975 | De Palma et al. | 359/455 |
| 4,083,626 A | 4/1978 | Miyahara et al. | 359/453 |
| 4,172,219 A | 10/1979 | Deml et al. | 219/121.6 |
| 4,268,118 A | 5/1981 | Palmquist et al. | 359/455 |
| 4,418,986 A | 12/1983 | Yata et al. | 359/456 |
| 4,490,010 A | 12/1984 | Honda et al. | 359/456 |

(List continued on next page.)

FOREIGN PATENT DOCUMENTS

| | | |
|---|---|---|
| AT | 97/03956.4 | 11/1997 |
| EP | 96309443 | 4/1997 |
| JP | 3-243932 A | 2/1990 |
| JP | 10-39769 | 2/1998 |

(List continued on next page.)

OTHER PUBLICATIONS

J.C. Love et al., "Microscope Projection Photolithography for Rapid Prototyping of Masters with Micron Sized Features for Use in Soft Lithography," Langmuir 2001, vol. 17, pp. 6005–6012.

C. Joubert et al., "Dispersive Holographic Microlens Matrix For Single LCD Protection," SPIE vol. 2650, pp. 243–252 (03/96).

Popovic et al. "Technique for Monolithic Fabrication of Microlens Arrays" Applied Optics, vol. 27, No. 7, pp. 1281–1284 (Apr. 1988).

(List continued on next page.)

*Primary Examiner*—Christopher Mahoney
(74) *Attorney, Agent, or Firm*—Myers Bigel Sibley & Sajovec

(57) ABSTRACT

A light-transmission screen includes a diffusing element formed from a micro-lens array for projecting images in a viewing space. The screen generates images of improved quality by varying structural features of one or more lenses in the array so that light is directed in different directions and/or with different optical properties compared with other lenses in the array. The structural features which are varied include any one or more of size, shape, curvature, or spacing of the lenses in the array. As a result of these variations, the screen achieves wider viewing angles, improved screen resolution and gain, and a greater ability to reduce or eliminate aliasing or other artifacts in the generated images compared with conventional screens. A method for making a light-transmission screen of this type preferably forms the micro-lens array using a stamping operation based on a master. By taking this approach, the screen is manufactured with fewer process steps and at less cost compared with conventional methods.

69 Claims, 18 Drawing Sheets

U.S. PATENT DOCUMENTS

| | | | | |
|---|---|---|---|---|
| 4,523,849 A | | 6/1985 | Stone | 356/369 |
| 4,666,248 A | | 5/1987 | van de Ven | 359/457 |
| 4,773,731 A | | 9/1988 | Goldenberg et al. | 359/457 |
| 4,799,137 A | | 1/1989 | Aho | 362/309 |
| 4,874,228 A | | 10/1989 | Aho et al. | 349/62 |
| 4,961,642 A | | 10/1990 | Ogino | 353/38 |
| 4,969,732 A | | 11/1990 | Wright et al. | 353/77 |
| 5,054,885 A | | 10/1991 | Melby | 359/618 |
| 5,122,905 A | | 6/1992 | Wheatley et al. | 359/586 |
| 5,122,906 A | | 6/1992 | Wheatley | 359/586 |
| 5,190,370 A | | 3/1993 | Miller et al. | 362/340 |
| 5,193,015 A | | 3/1993 | Shanks | 359/443 |
| 5,223,869 A | | 6/1993 | Yanagi | 353/78 |
| 5,333,072 A | | 7/1994 | Willett | 359/41 |
| 5,337,106 A | | 8/1994 | Jutamulia et al. | 396/447 |
| 5,337,179 A | | 8/1994 | Hodges | 359/443 |
| 5,381,309 A | | 1/1995 | Borchardt | 362/31 |
| 5,404,076 A | | 4/1995 | Dolan et al. | 313/572 |
| 5,442,482 A | | 8/1995 | Johnson et al. | 359/619 |
| 5,453,859 A | | 9/1995 | Sannohe et al. | 359/63 |
| 5,467,154 A | | 11/1995 | Gale et al. | 353/119 |
| 5,486,949 A | | 1/1996 | Schrenk et al. | 359/498 |
| 5,496,668 A | | 3/1996 | Guckel et al. | 430/9 |
| 5,504,391 A | | 4/1996 | Turner et al. | 313/570 |
| 5,557,343 A | | 9/1996 | Yamagishi | 348/781 |
| 5,563,738 A | | 10/1996 | Vance | 359/614 |
| 5,573,324 A | | 11/1996 | De Vaan | 353/77 |
| 5,606,220 A | | 2/1997 | Dolan et al. | 313/637 |
| 5,612,820 A | | 3/1997 | Schrenk et al. | 359/498 |
| 5,615,045 A | | 3/1997 | Takuma et al. | 359/456 |
| 5,626,800 A | | 5/1997 | Williams et al. | 264/1.38 |
| 5,642,226 A | | 6/1997 | Rosenthal | 359/619 |
| 5,644,431 A | | 7/1997 | Magee | 359/619 |
| 5,661,531 A | | 8/1997 | Greene et al. | 349/73 |
| 5,670,842 A | | 9/1997 | Dolan et al. | 313/570 |
| 5,682,080 A | | 10/1997 | Dolan et al. | 313/570 |
| 5,686,793 A | | 11/1997 | Turner et al. | 313/570 |
| 5,688,064 A | | 11/1997 | Shanks | 403/24 |
| 5,692,820 A | | 12/1997 | Gale et al. | 353/77 |
| 5,695,895 A | | 12/1997 | Johnson et al. | 430/5 |
| 5,796,499 A | | 8/1998 | Wenyon | 359/15 |
| 5,801,794 A | * | 9/1998 | Lehureau et al. | 359/628 |
| 5,870,224 A | | 2/1999 | Saitoh et al. | 359/456 |
| 5,877,874 A | | 3/1999 | Rosenberg | 359/15 |
| 5,877,893 A | | 3/1999 | Kim | 359/456 |
| 5,932,342 A | | 8/1999 | Zeira et al. | 428/327 |
| 5,933,276 A | | 8/1999 | Magee | 359/455 |
| 6,185,038 B1 | * | 2/2001 | Yamaguchi et al. | 359/457 |
| 6,278,546 B1 | | 8/2001 | Dubin et al. | 359/452 |
| 6,301,051 B1 | | 10/2001 | Sankur | 359/626 |
| 6,335,828 B1 | | 1/2002 | Hashimoto et al. | 359/443 |
| 6,353,500 B1 | * | 3/2002 | Guigan et al. | 359/456 |
| 6,410,213 B1 | | 6/2002 | Raguin et al. | 430/321 |
| 6,469,830 B1 | * | 10/2002 | Dubin et al. | 359/457 |
| 6,552,848 B2 | * | 4/2003 | Kobayashi | 359/457 |
| 6,590,605 B1 | * | 7/2003 | Eichenlaub | 348/51 |
| 6,594,079 B1 | | 7/2003 | Trott et al. | 359/456 |
| 2002/0034014 A1 | | 3/2002 | Gretton et al. | 359/619 |
| 2002/0034710 A1 | | 3/2002 | Morris et al. | 430/321 |
| 2002/0145797 A1 | | 10/2002 | Sales | 359/456 |

FOREIGN PATENT DOCUMENTS

| | | |
|---|---|---|
| JP | 10-123623 | 5/1998 |
| JP | 10-239503 | 9/1998 |
| JP | 11-101902 | 4/1999 |
| WO | 0488590 A1 | 11/1991 |
| WO | 0657769 A1 | 12/1994 |
| WO | 94/29768 | 12/1994 |
| WO | WO 95/34832 | 12/1995 |
| WO | WO 9727606 | 7/1997 |

OTHER PUBLICATIONS

A.V. Parfenov and A. Putilin, "Advanced Optical Schemes With Liquid Crystal Image Converters For Display Applications," SPIE vol. 2650, pp. 173–179 (Jul. 1996).

W.J. Gambogi et al., "Color Holography Using DuPont Holographic Recording Films," SPIE vol. 2405, pp. 62–73 (01/95).

"Improved Process of Reflection Holography Replication and Heat Processing," SPIE vol. 2176 Practical Holography VIII, pp. 172–183 (1994). D. Tipton, M. Armstrong & S. Stevenson.

W. Gambogi et al., "HOE Imaging in DuPont Holographic Photopolymers," SPIE vol. 2152, pp. 282–293 (06/94).

W. Gambogi et al., "Advances and Applications of DuPont Holographic Photopolymers," SPIE vol. 2043, pp. 2–13 (1993).

W. Gambogi et al., "Diffractive Printing Methods Using Volume Holograms," IS&T/SPIE 1993, *Intl. Conf. on Electronic Imaging Conf.*

W. Gambogi et al., "Holographic Transmission Elements Using Improved Photopolymer Films," SPIE vol. 1555 Computer and Optically Generated Holographic Optics (Fourth in a Series), pp. 256–266 (1991).

Andrew M. Weber et al., "Hologram Recording in DuPont's New Photopolymer Materials," Practical Holography IV, SPIE OE/Lase Conference Proceedings (1990).

Andrew M. Weber et al., "Hologram Recording in DuPont's New Photopolymer Materials," SPIE vol. 1212 Practical Holography IV, pp. 30–39 (1990).

* cited by examiner 20 x 20 Array

Micro lenslet design

| height(um) | radius(um) |
|---|---|
| 25.0 | 0.0 |
| 25.0 | 1.0 |
| 24.9 | 2.0 |
| 24.7 | 3.0 |
| 24.5 | 4.0 |
| 24.2 | 5.0 |
| 23.7 | 6.0 |
| 23.1 | 7.0 |
| 22.4 | 8.0 |
| 21.4 | 9.0 |
| 20.2 | 10.0 |
| 18.6 | 11.0 |
| 16.7 | 12.0 |
| 14.3 | 13.0 |
| 11.4 | 14.0 |
| 7.9 | 15.0 |
| 3.5 | 16.0 |
| 0.0 | 17.0 | lenslet spacing x direction: 35 um
lenslet spacing y direction: 22 um
packing: modified hexagonal
randomized factor for lenslet centers: plus/minus 20%

Substrate

Substrate coated with mask film

Lenses replicated on coated side of material

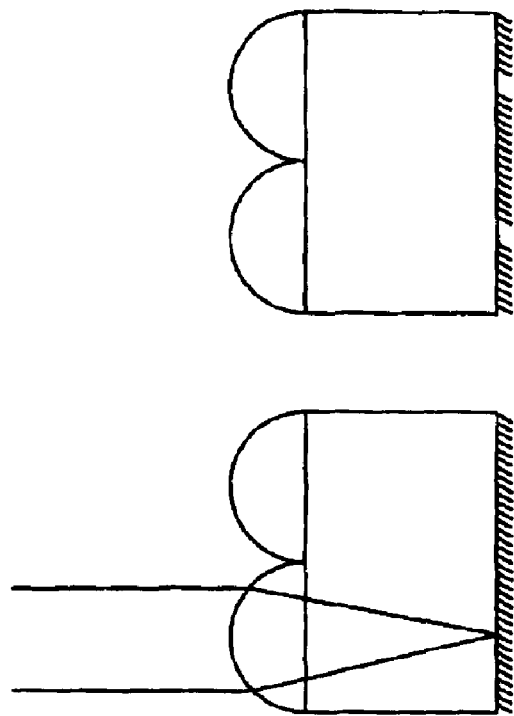
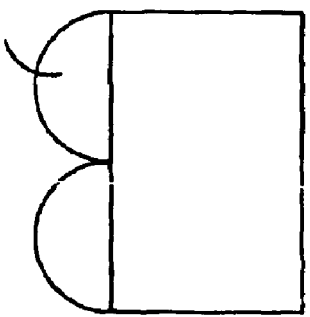
FIG. 24a   FIG. 24b   FIG. 24c   FIG. 24d

MICRO-LENS ARRAY BASED LIGHT TRANSMITTING SCREEN WITH HIGH RESOLUTION AND LOW IMAGING ARTIFACTS

CROSS-REFERENCE TO RELATED APPLICATIONS

This application is a continuation-in-part of U.S. patent application Ser. No. 10/120,785 filed on Apr. 12, 2002, which is a continuation-in-part of U.S. patent application Ser. No. 09/521,236, filed Apr. 5, 2000, now U.S. Pat. No. 6,483,612, which is a continuation of U.S. patent application Ser. No. 08/060,906, filed Apr. 15, 1998, now abandoned. The contents of the above prior applications are hereby incorporated by reference.

BACKGROUND OF THE INVENTION

1. Field of the Invention

This invention relates to generating images, and more particularly to a light-transmission screen for projecting images in televisions, computers, and/or other display devices. The invention also relates to a method for making a light-transmission screen of the aforementioned type.

2. Description of the Related Art

Light-projection systems are used to generate images in computer monitors, televisions, and other forms of display devices. Two types of light-projection systems are available in the market today: rear-projection systems and front-projection systems. In a rear-projection system, a beam of light is projected onto the rear side of an angle-transforming screen. The screen transmits an image corresponding to the beam to a front side of the screen, where it can be seen by a viewer. Conversely, in a front-projection system a light beam is directed onto the front side of a screen where it is then reflected towards a viewer. Because of their optical properties, screens in rear-projection systems are often referred to as transmission-type screens.

Screens in conventional rear-projection displays perform a number of functions. First, these screens distribute light from an image engine into a viewing space. An example of such a viewing space is shown in FIGS. 1(a) and 1(b). In these figures, angles $\phi_V$ and $\phi_H$ define the range of viewing angles measured in vertical and horizontal directions relative to a normal (dotted line) of the screen. The viewing angles are delimited by beams 1 and 2, which correspond to places where the intensity of the projected image falls to half the value it has in the normal direction. In conventional screens, angles $\phi_V$ and $\phi_H$ are small values, typically 15° and 35° respectively. As a result, the images generated by these screens is projected into a small viewing area.

Second, rear-projection screens must generate images have a certain minimum resolution.

Third, rear-projection screens must provide the viewer with a high contrast image.

Fourth, rear-projection screens must provide sufficient gain to enable comfortable viewing in normal ambient light conditions.

Fifth, rear-projection screens must minimize artifacts, such as aliasing, which tends to degrade image quality. The exact parameters and specifications for each of these requirements will vary with each application.

FIG. 2a shows one type of conventional rear-projection screen which performs the aforementioned functions. These screens are formed from an array of lenticular lenses 3 separated by stripes 4 of black material. Current lenticular lens arrays generate insufficient resolution and contrast for purposes of displaying high-quality digital images.

FIG. 2b shows another type of conventional rear-projection screen. This screen includes a plurality of glass beads 5 embedded in a black matrix 6. Screens of this type are often niche-type devices and have proven unsuitable for many reasons. This is mainly attributable to their use of beads as optical elements for projecting light. For example, it is difficult to produce different angular light-distribution patterns in both vertical and horizontal directions using beads because they all have the same spherical shape and curvature. As a result, light is directed to unwanted areas, for example, towards the ceiling where there are no viewers. In addition, manufacture difficulties associated with this type of screen result in inhomogeneous placement of the beads, including areas with no beads ("drop outs").

In view of the foregoing considerations, it is clear that there is a need for a light-transmission screen which overcomes the drawbacks of conventional screens, and more specifically one which generates images of improved quality using a light-diffusing element which enhances control of the projected light at less cost and with substantially fewer manufacturing steps compared with conventional screens.

SUMMARY OF THE INVENTION

An object of the present invention is to provide a light-transmission screen which overcomes the drawbacks of conventional screens.

Another object of the present invention is to provide a light-transmission screen which generates images of improved quality compared with those produced by conventional screens.

Another object of the present invention is to provide a light-transmission screen which improves image quality by providing independent control of viewing angles in vertical and horizontal directions.

Another object of the present invention is to provide a light-transmission screen which improves image quality by achieving higher resolution than is attainable by conventional screens.

Another object of the present invention is to provide a light-transmission screen which improves image quality by achieving higher gain than is attainable by conventional screens.

Another object of the present invention is to provide a light-transmission screen which improves image quality by more effectively eliminating aliasing and other image artifacts compared with conventional screens.

Another object of the present invention is to achieve one or more of the aforementioned object using a diffusing element which projects light into a viewing area with greater control than conventional screens.

Another object of the present invention is to achieve this greater control using a diffusing element which includes a micro-lens array, where structural features of individual lenses in the array are varied so that some lenses project light in different directions and/or with different optical properties than others.

Another object of the present invention is to provide a method of making a light-transmission screen which satisfies one or more of the aforementioned objects.

Another object of the present invention is to provide a method for making a light-transmission screen which has substantially fewer manufacturing steps and is more economical to implement compared with conventional screens.

The foregoing and other objects and advantages of the present invention are achieved by providing a light-transmission screen, including a lens array comprising a plurality of lenses for projecting light, wherein at least two lenses are assigned to each pixel of the screen so as to obtain a desired screen resolution.

In accordance with another embodiment, the present invention provides a light-transmission screen, including a lens array comprising a plurality of lenses for projecting light, a mask layer, comprising a plurality of apertures, optically coupled to the lens array and positioned on a viewing side of the lens array, wherein each aperture is registered to a corresponding lens in the lens array and is adapted to pass light from its corresponding lens, wherein each pixel of the screen is generated by light from at least two lens/aperture combinations.

The present invention is also a method for making a light-transmission screen having any one or more of the aforementioned features. In accordance with one embodiment, the method includes providing a transparent substrate, coating a surface of the substrate with a mask layer, forming a micro-lens array over the mask, and forming apertures in the mask, each of which are aligned to receive light from one or more lenses in the array. The micro-lens array is preferably formed based on a stamping operation using a master. An optional step includes forming an anti-reflective coating on an opposing surface of the substrate.

In accordance with another embodiment, the present invention provides a method for making a light-transmission apparatus, which is similar to the above method except that the mask layer and lens array are formed on different sides of the substrate.

In accordance with another embodiment, the present invention provides a method for making a light-transmission apparatus which includes forming a micro-lens array on a transparent substrate, coating a surface of the substrate opposing the lens array with an adhesive, curing the adhesive, for example with UV light, and then forming a mask layer over the adhesive. The portions of the adhesive struck by UV light are removed but those portions not exposed to the light remain. As a result, the mask layer forms only over the unexposed portions of the adhesive layer leaving apertures.

BRIEF DESCRIPTION OF THE DRAWINGS

FIGS. 24a–d are diagrams showing results obtained at various steps of the method of FIG. 23.

DESCRIPTION OF THE PREFERRED EMBODIMENTS

The present invention is a light-transmission screen which generates images of improved quality compared with conventional screens of this type. The screen is particularly suitable for generating images in rear-projection systems, such as televisions and computer monitors, and will be described below in that context for illustrative purposes. However, the screen of the present invention may be used in other applications including, but not limited to, diffusers and other diffractive optical systems which evenly diffuse light over large areas and solar panels.

Figure 1B:
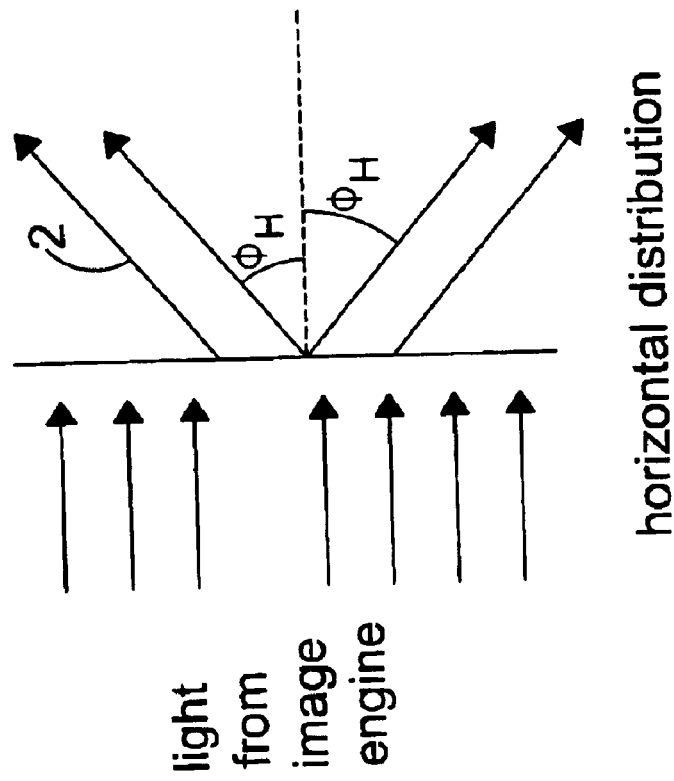
FIG. 1(b) is a diagram of a viewing space produced in a horizontal direction by a conventional Light-transmission screen.
Figure 1A:
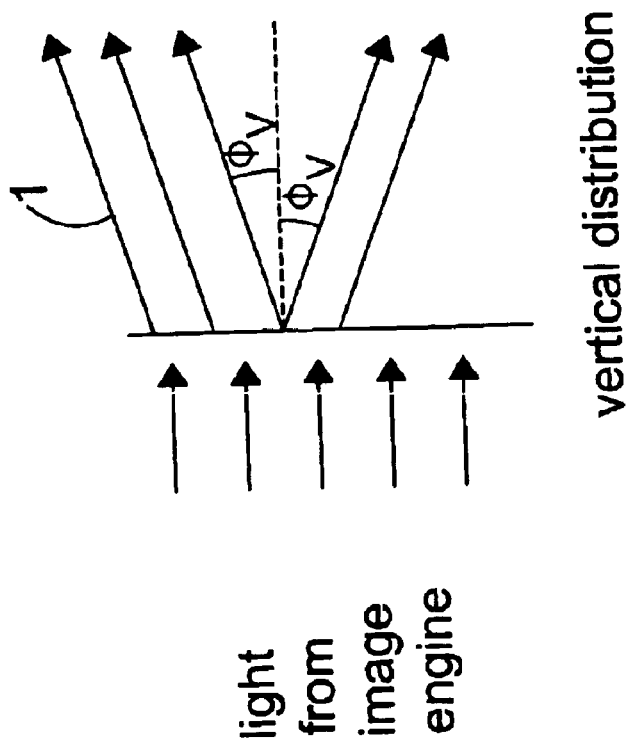
FIG. 1(a) is a diagram of a viewing space produced in a vertical direction by a conventional light-transmission screen.
Figure 2A:
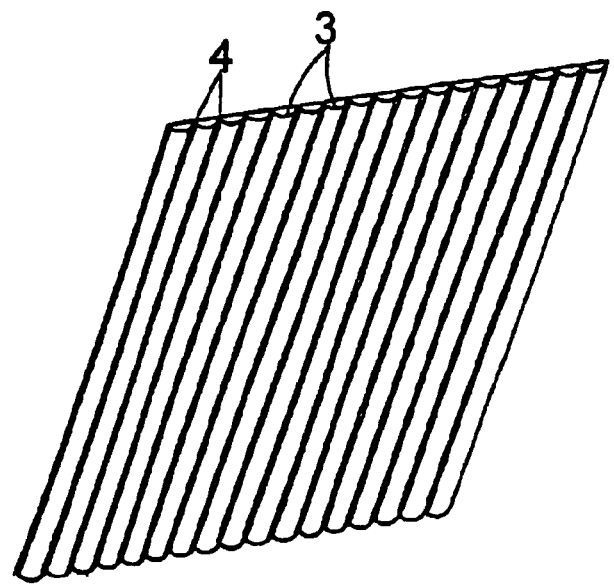
FIG. 2a is a diagram of a conventional light-transmission apparatus including a lenticular lens array.
Figure 2B:
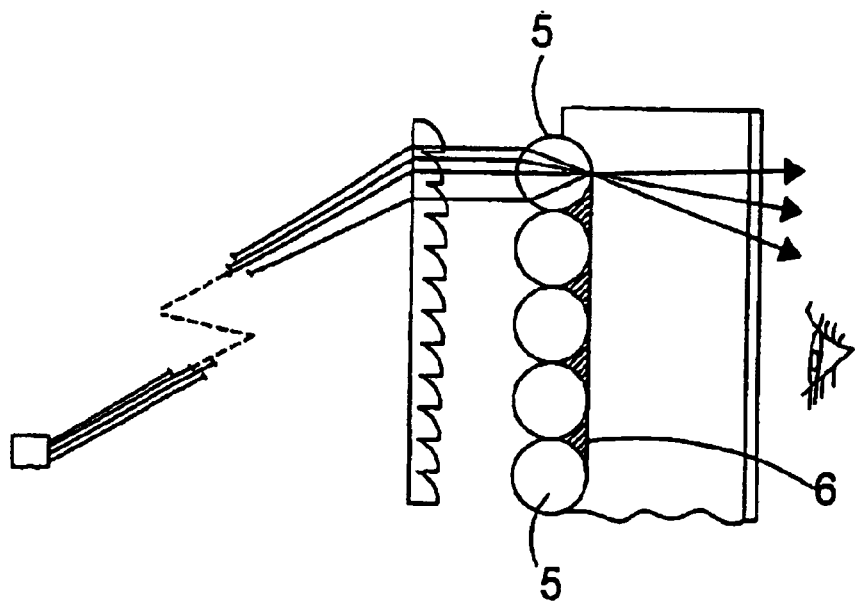
FIG. 2b is a diagram of a conventional Light-transmission apparatus including glass beads embedded in a black matrix.
Figure 3:
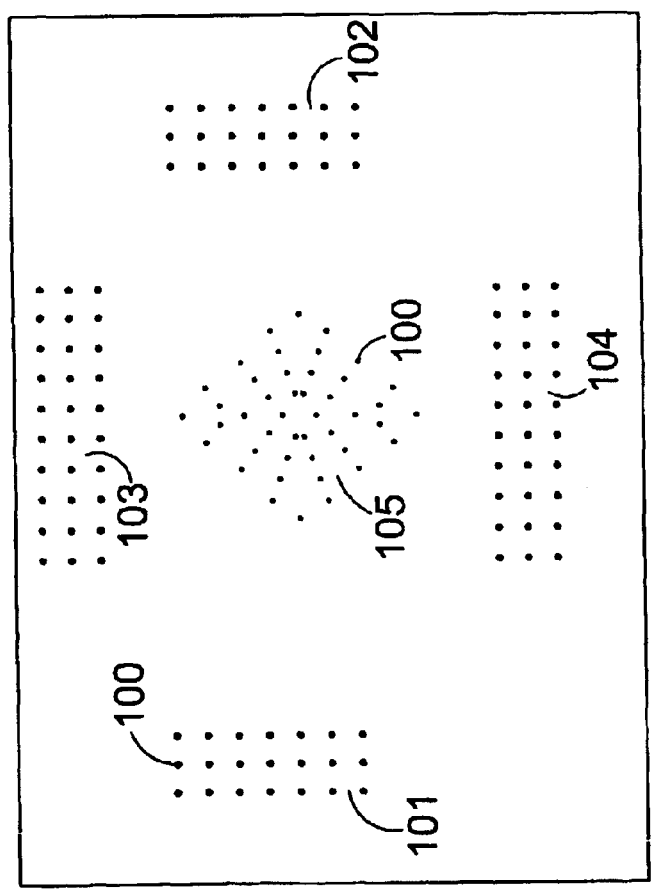
FIG. 3 is a diagram of a Light-transmission screen that may include a micro-lens array in accordance with any of the embodiments of the present invention.

FIG. 3 shows a light-transmission screen which includes a plurality of lenses 100 for projecting an image within a predetermined viewing area. These lenses are formed in a micro-lens array, the structure of which will be explained in greater detail below. For illustrative purposes, the lenses are grouped into five regions: regions 101 and 102 are located along lateral sides of the screen, two regions 103 and 104 are located along top and bottom portions of the screen, and one region 105 is located at a central portion of the screen. While only five regions are shown, those skilled in the art can appreciate that the entire screen may be populated with lenses in order to provide a complete image to the viewer.

In accordance with the present invention, the screen lenses may be structurally varied to improve the quality of the projected image, expand the effective viewing range of the screen, reduce image artifacts, and/or achieve any one of a number of other objectives. The structural variances may exist between or among the lenses in one region of the screen or in different regions. Each structural variance may he individually taken to correspond to a different embodiment of the screen of the present invention. Additionally, these variances may be combined to achieve one or more of the quality, range, or anti-artifact objectives previously mentioned.

Figure 4:
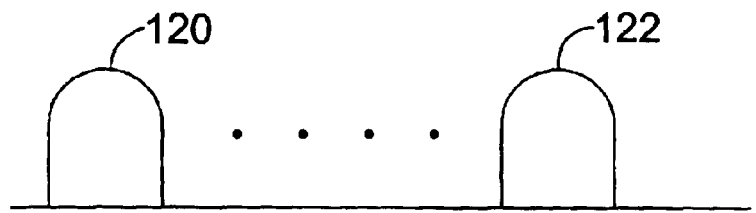
FIG. 4 is a diagram showing the formation of lenses in a micro-lens array in accordance with one embodiment of the invention.

FIG. 4 shows how lenses may be structurally varied in accordance with one embodiment of the light-transmission screen of the present invention. In this embodiment, at least two lenses have an aspherical shape. In the example shown, lenses 120 and 122 are substantially elliptical, however the lenses may have other aspherical shapes or curvatures if desired. Also, the aspherical lenses may be adjacent one another or separated by one or more lenses having the same or different shapes.

Figure 5:
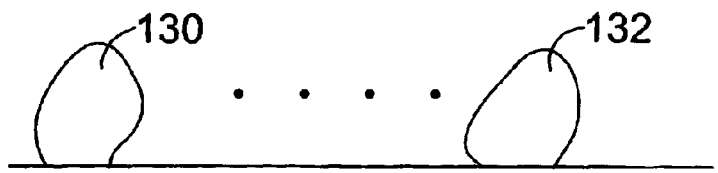
FIG. 5 is a diagram showing the formation of lenses in a micro-lens array in accordance with another embodiment of the invention.

FIG. 5 shows how lenses may be structurally varied in accordance with another embodiment of the screen of the present invention. In this embodiment, at least two lenses not only have an aspherical shape, but are also asymmetrical. The asymmetry may exist along one or more axes or the lenses may be completely asymmetrical so as to be irregular in shape. In the example shown, lenses 130 and 132 are substantially egg-shaped and thus are asymmetrical with respect to a horizontal axis passing through the lens. Also, the asymmetrical lenses may be adjacent one another or separated by one or more lenses having the same or different shapes.

Figure 6:
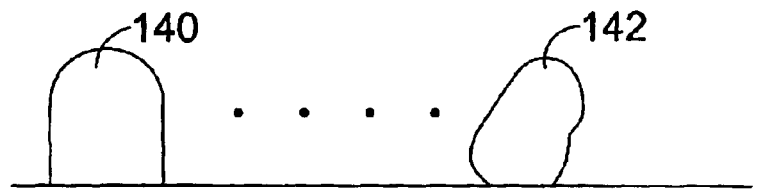
FIG. 6 is a diagram showing the formation of lenses in a micro-lens array in accordance with another embodiment of the invention.

FIG. 6 shows how lenses may be structurally varied in accordance with another embodiment of the screen of the present invention. In this embodiment, at least one lens has a spherical or hemispherical shape and at least another lens has an aspherical shape or aspherical and asymmetrical shape. In the example shown, lens 140 has a hemispherical shape and lens 142 a shape which is asymmetrical along only one axis. Alternatively, the lenses may be completely asymmetrical so as to be irregular. The lenses may be adjacent one another or separated by one or more lenses having the same or different shapes.

Figure 7:
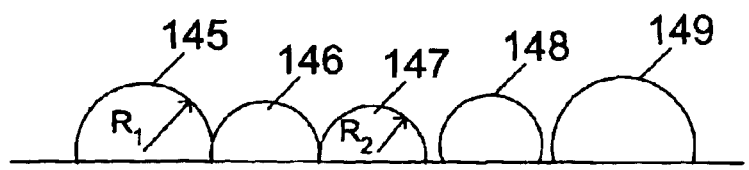
FIG. 7 is a diagram showing the formation of lenses in a micro-lens array in accordance with another embodiment of the invention.

FIG. 7 shows how lenses may be structurally varied in accordance with another embodiment of the screen of the present invention. In this embodiment, all lenses are spherically or hemispherically shaped, however their radiuses of curvature are different. In the example shown, lenses 145 and 149 have a radius $R_1$ which is greater than a radius $R_2$ of lenses 146 and 147. These lenses may be adjacent one another or separated by lenses which have the same or different curvatures. Hemispherical lens 148 is provided to show that lenses with varying radiuses of curvature may also be varied in terms of their spacing within a single micro-lens array.

Figure 8:
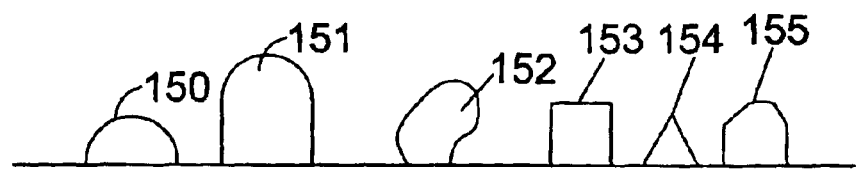
FIG. 8 is a diagram showing the formation of lenses in a micro-lens array in accordance with another embodiment of the invention.

FIG. 8 shows how lenses may be structurally varied in accordance with another embodiment of the screen of the present invention. In this embodiment, at least two lenses have different sizes and/or shapes. The size differences may, for example, be in terms of diameter, height, and/or thickness. In the example shown, lenses 150, 151, and 152 differ in all three of these dimensions. Lenses 153, 154 and 155 show examples of how the shape of the lenses may differ. Lenses 153, 154 and 155 are square-shaped, triangular-shaped and polygonal-shaped, respectively. The lenses may be adjacent one another or separated by one or more lenses having the same or different shapes.

Figure 9:
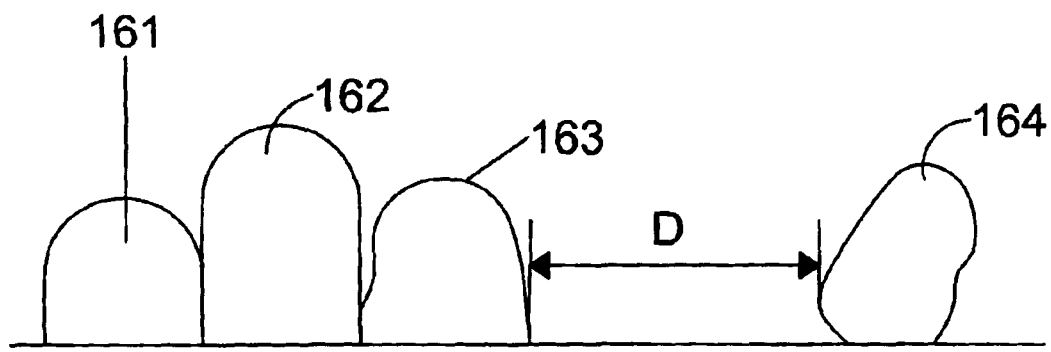
FIG. 9 is a diagram showing the formation of lenses in a micro-lens array in accordance with another embodiment of the invention.

FIG. 9 shows how lenses may be structurally varied in accordance with another embodiment of the screen of the present invention. In this embodiment, the packing arrangement is chosen to achieve a desired effect. For example, the spacing may be varied in one or more directions in order to achieve a desired effect. In the example shown, lenses 161–163 are in an abutting relationship to one another and lenses 163 and 164 are separated by a distance D. If desired, the lenses may be varied in horizontal and vertical directions to achieve a desired packing arrangement. A hexagonal arrangement has been found to be preferable, but other arrangements, such as a square or pentagonal packing arrangement, are possible.

Figure 10:
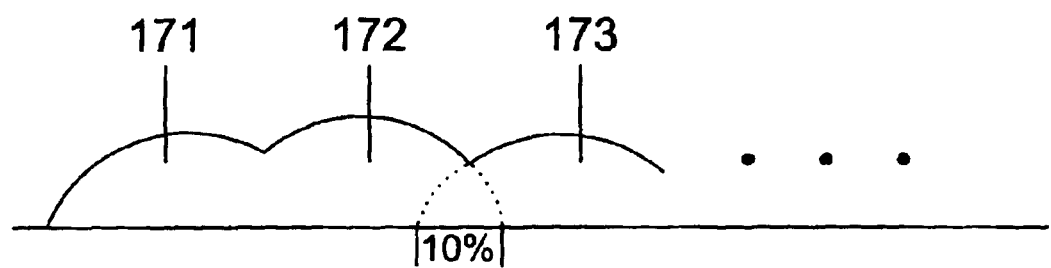
FIG. 10 is a diagram showing the formation of lenses in a micro-lens array in accordance with another embodiment of the invention.

FIG. 10 shows how lenses may be structurally varied in accordance with another embodiment of the screen of the present invention. In this embodiment, the lenses overlap either uniformly or randomly. In the example shown, lenses 171–173 overlap by a uniform amount, e.g., by 10%.

Figure 11:
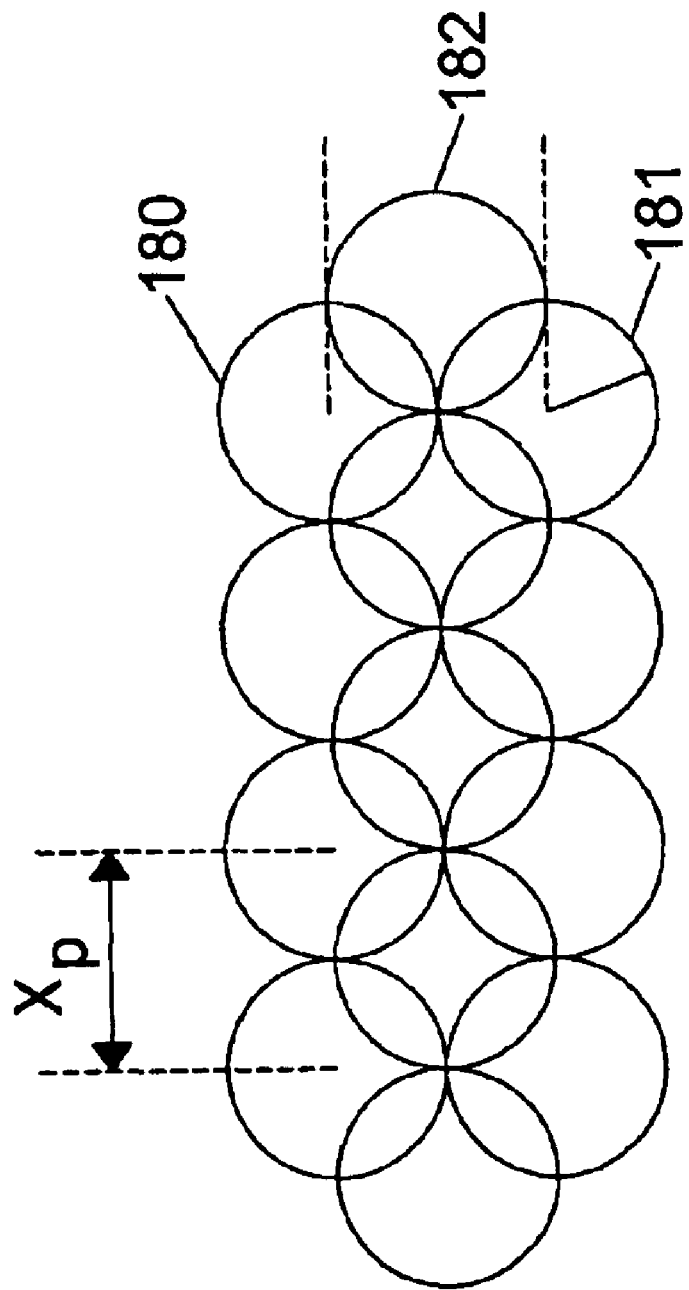
FIG. 11 is a diagram showing the formation of lenses in a micro-lens array in accordance with another embodiment of the invention.

FIG. 11 shows another overlapping pattern of lenses. This pattern includes three rows of lenses. The first and second rows of lenses 180 and 181 include spherically or hemi-spherically shaped lenses which are adjacent one another but do not overlap. Centers of the lenses in the first and second rows may be spaced by an amount $X_p$. The third row of lenses 182 overlap the first and second rows by predetermined amounts. Preferably, each of the lenses in the second row overlaps two lenses in the first tow and two lenses in the second row by a same amount. The degree, uniformity, and pattern of overlap may be altered to produce any desired effect. While the use of spherical or hemispherical lenses is preferable, aspherical and/or asymmetrical lenses may be used in an overlapping pattern if desired. Also, the lenses may be arranged according to a hexagonal packing scheme with fill factors from 95% and above.

Figure 12:
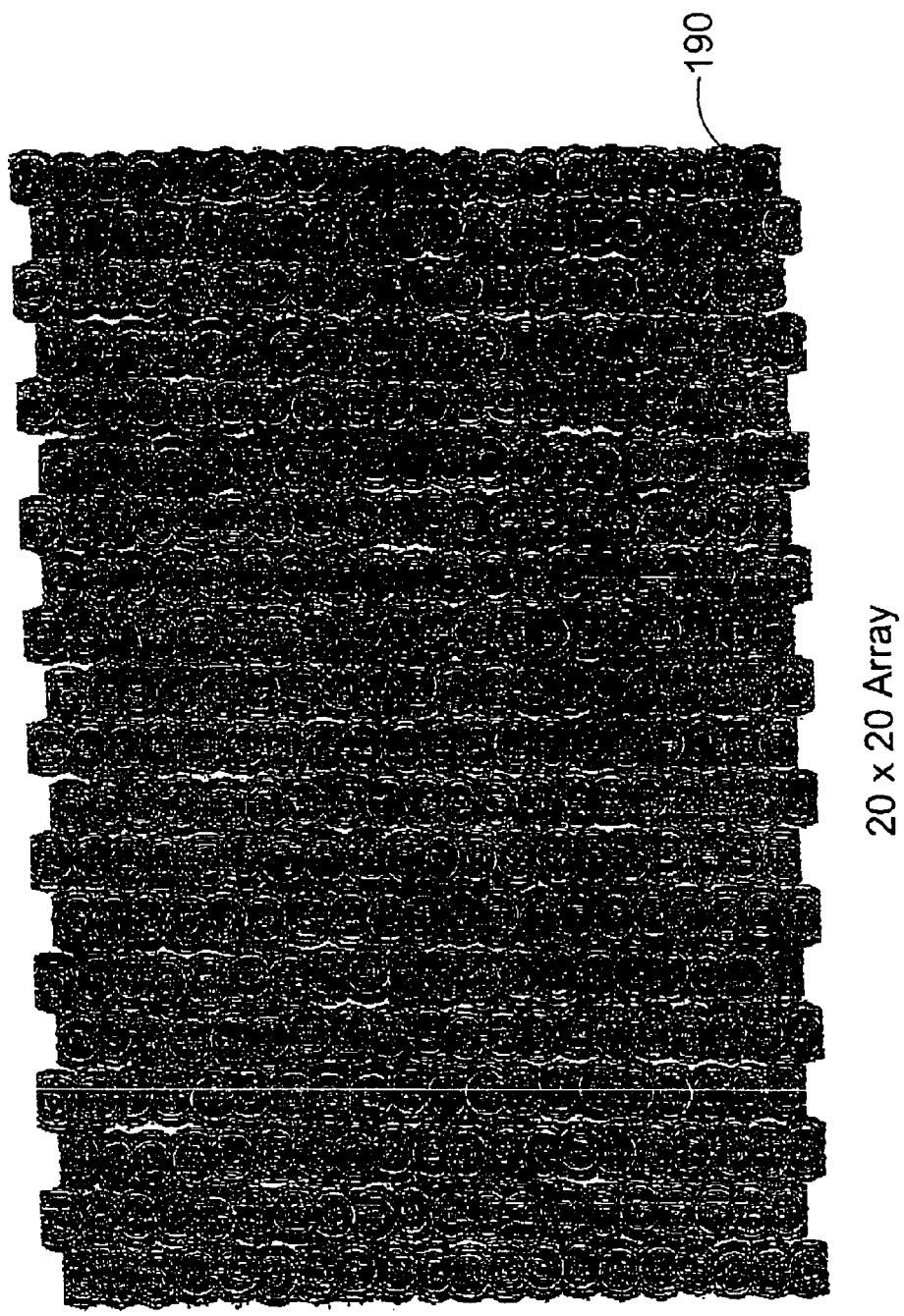
FIG. 12 is a diagram showing the formation of lenses in a micro-lens array in accordance with another embodiment of the invention.

FIG. 12 shows another overlapping pattern of lenses. In this example, overlapping lenses are arranged in the form of a matrix 190. In the matrix, the lenses randomly overlap one another in at least one direction and in some cases in two directions. This may be achieved by allowing the centers of the lenses to travel up to a predetermined amount (e.g., 20%) of the inter-lens spacing along one or more axes. The following steps may be taken to generate such a randomized lens pattern.

First, initial parameters are selected including the size and initial spacing of each lens in the array, as well as the number of lenses therein. Moor example, each of the lenses may be 60 microns in diameter and may he spaced from one another so that their centers are 50 microns apart in the horizontal direction and 30 microns apart in the vertical direction. Also, the lenses may be arranged, for example, in a 20×20 matrix.

Second, a vector is computed for the center of each lens. The horizontal component of the vector may be a random number in the range of −10 microns to +10 microns and the vertical component may be a random number in the range of −6 microns to +6 microns. The center of each lens may then be displaced from its original position based on the computed vector.

Third, the newly computed centers of the lenses are used as a basis for patterning a master. The master is then used to generate a micro-lens array, in a manner that will be discussed in more detail below, which array includes one or more replications of the 20×20 pattern of overlapping lenses. The initial parameters may be varied to produce virtually any pattern of lenses desired, including ones which overlap in a different manner or which do not overlap at all. In addition, the size of the pattern is not limited to the 20×20 pattern described above. This pattern may then be formed on the master roller so that, for example, the micro-lens array may be mass-produceed in the quantity desired in order to meet consumer demands.

Figure 13:
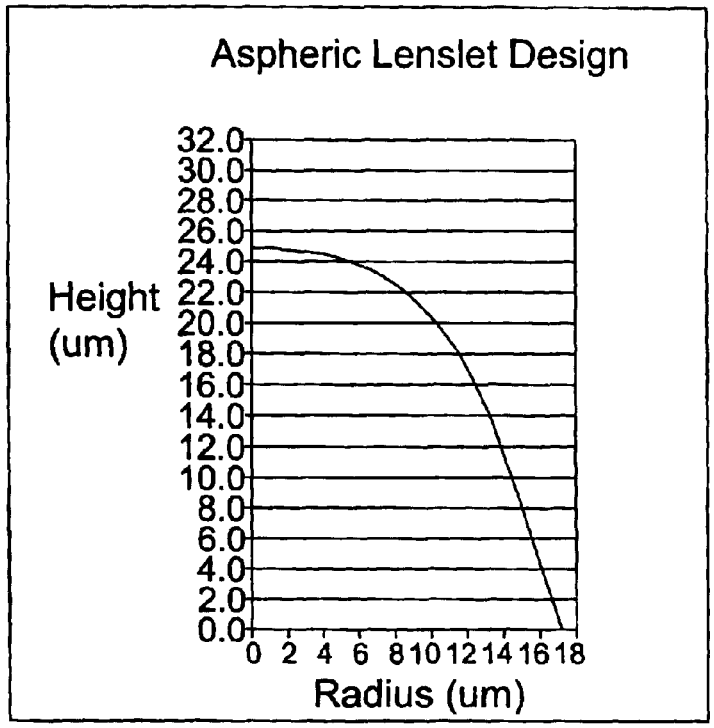
FIG. 13 is a graph showing a profile curve which may be used as a basis for forming a micro-lens array in accordance with the present invention.

FIG. 13 is a graph which provides a profile curve may be used as a guide for constructing an aspherical lens design for a 25-micron radius lens in accordance with the present invention. In this graph, lens height is plotted against lens radius of curvature and the following table sets forth values that lie along the curve. Only profile information is given since the lens is radially symmetric. To image the full lens, the profile curve may be rotated about the y-axis. By using the profile curve in the graph, a micro-lens array may be constructed in the form of a matrix which, for example, has a lens spacing of 35 microns in the x-direction and 22 microns in the y-direction. Such a matrix may also have a modified hexagonal packing arrangement, where the centers of lenses have a randomized factor of plus or minus 20%. Such a factor may produce a matrix where the lenses overlap in one or more directions.

| Height (gm) | Radius of Structure ($\mu$m) |
|---|---|
| 25.0 | 1.0 |
| 24.9 | 2.0 |
| 24.7 | 3.0 |
| 24.5 | 4.0 |
| 24.2 | 5.0 |
| 23.7 | 6.0 |
| 23.1 | 7.0 |
| 22.4 | 8.0 |
| 21.4 | 9.0 |
| 20.2 | 10.0 |
| 18.6 | 11.0 |
| 16.7 | 12.0 |
| 14.3 | 13.0 |
| 11.4 | 14.0 |
| 7.9 | 15.0 |
| 3.5 | 16.0 |
| 0.0 | 17.0 |

The aforementioned embodiments of the screen of the present invention may be combined in any manner desired. For example, varying the shape, curvature, spacing, and/or size of the lenses may be used as a basis for improving image quality, expanding viewing angle, independently controlling the viewing angles in two or more directions (e.g., vertical and horizontal directions), and controlling or reducing or eliminating aliasing or other unwanted image artifacts. Some specific examples will now be provided.

Figure 14:
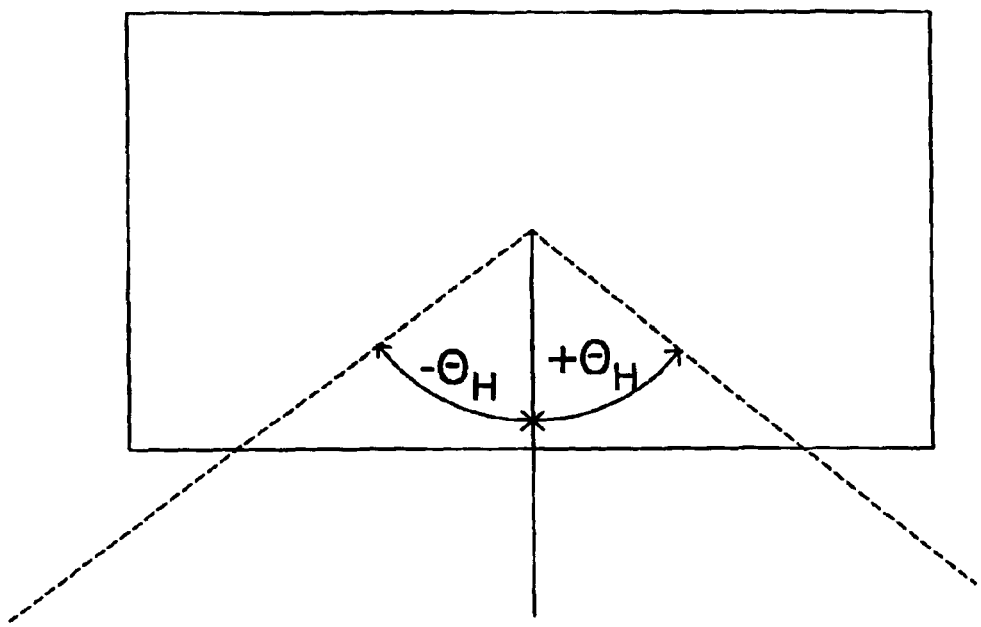
FIG. 14 is a diagram showing one example of a viewing range in the horizontal direction achieved by the light-transmission screen of the present invention.
Figure 15:
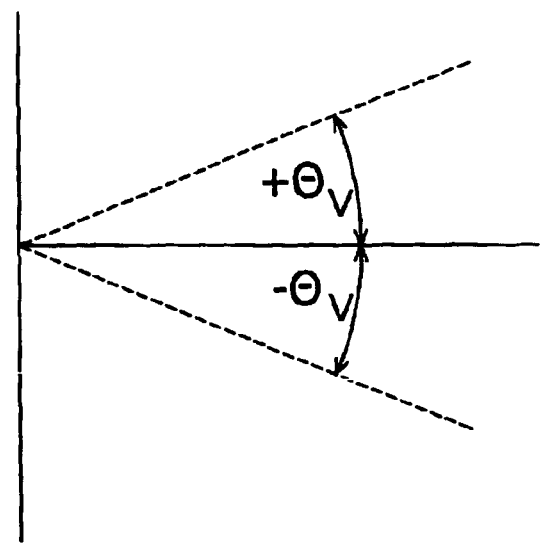
FIG. 15 is a diagram showing one example of a viewing range in the vertical direction achieved by the light-transmission screen of the present invention.

FIG. 14 shows an example of a light-transmission screen where the curvatures of the lenses are decreased from the center of the screen to its edges in a horizontal direction. Through this lens pattern, a wide viewing angle $\theta_H$ may be achieved in the horizontal direction. This angle may, for example, extend ±70° from a normal perpendicular to the screen, which is substantially wider than viewing ranges that can be achieved by conventional transmission screens. If desired, the curvatures of the lenses may be varied less in the vertical direction, e.g., a viewing angle of $\theta_H$ extending ±15 from normal may be achieved. (See FIG. 15). Alternatively, instead of a progressive change in lens curvature from a center to a perimeter of the screen, lenses located in a central region of the screen may all have the same structural design. In this case, outer lenses (e.g., lenses along the edges) may be varied in curvature in order to produce the enhanced viewing angle.

Structural variations to achieve other improvements are also possible. For example, the structure of the screen lenses may be varied to achieve a predetermined gain within a viewing area. The term gain refers to a ratio of intensities of light based on an effect known as the Lambertian screen. Lambertian screen effect occurs when an intensity of light at a small area in the screen is uniformly distributed in every angle. Screen gain refers to a ratio of the intensity of fight at an arbitrary point where a viewer is located and the Lambertian screen at that point. As those skilled in the art can appreciate, the gain may be greater or less than unity.

In accordance with another embodiment of the present invention, the lenses at one or more regions of the screen may therefore be structurally varied to project beams in a manner and/or in directions that will achieve a desired gain in a viewing area. This may be accomplished, for example, by forming the lenses so that a greater intensity of light is directed at one particular direction of the screen than at another. Through these structural variations, a light-transmission screen included, for example, in a rear-projection system may be designed to have a gain sufficient to provide comfortable viewing of projected images from digital image engines in a wide variety of ambient light conditions.

In accordance with another embodiment of the present invention, lenses in one or more regions of the screen may be varied to distribute light to appropriate half-power half-angles in horizontal and/or vertical directions. This may be accomplished, for example, using aspherical and/or asymmetrical lenses which generate an angular distribution of light from an image engine in the direction(s) desired. By using lenses of this type, light can be distributed differently in different directions.

Figure 16:
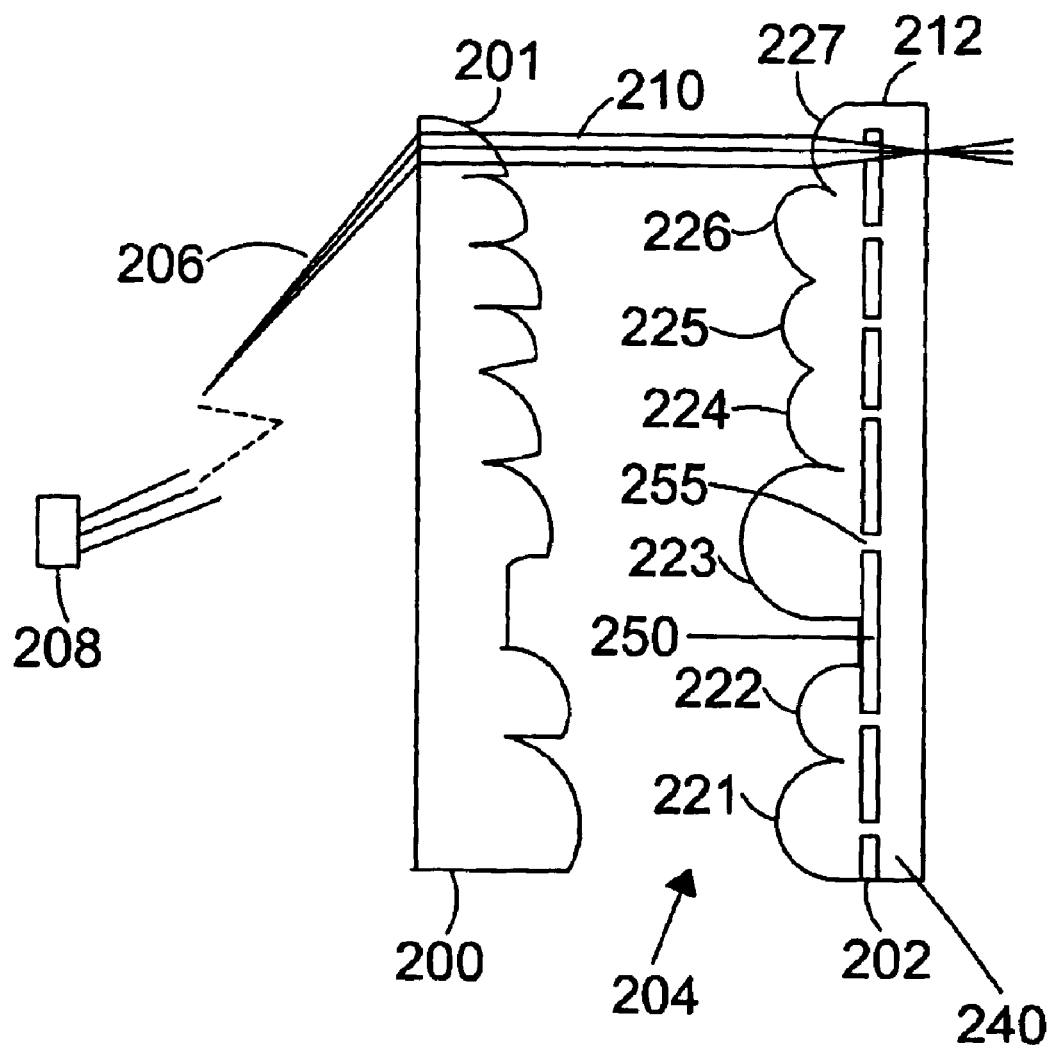
FIG. 16 is a diagram of an embodiment of a light-transmission screen in accordance with the present invention.

FIG. 16 shows a cross-sectional view of a transmission screen including a micro-lens array having any of the aforementioned structural variations. This screen includes first and second optical layers 200 and 202 which ate at least substantially parallel and spaced by an air gap 204. The first optical layer includes a collimator in the form of a Fresnel lens 201. This lens converts incident light 206 from an image engine 208 into collimated beams 210. Other types of light collimators, such as holographic optical elements, may be used in place of the Fresnel lens 201.

The second optical layer is a diffuser 212 which includes a plurality of lenses 221–227 situated along an incident surface. The lenses may be made from any one of a variety of transparent materials. A mask layer 250 containing a plurality of apertures 255 is formed on a light-exiting side of the substrate. The mask layer may be a black mask and the apertures are preferably aligned precisely with exit pupils of corresponding ones of the lenses. Aligning the apertures in this manner is beneficial because it increases contrast, reduces reflected light, and prevents transmission of stray light from within the projection system to the viewer. The aligned apertures are preferably formed using the techniques disclosed in U.S. patent application Ser. No. 10/452,238 titled "Micro-Lens Array with Precisely Aligned Aperture Mask and Methods of Producing Same", the contents of which are incorporated herein by reference. Also, as shown, the micro-lens array may be formed from combinations of spherical/hemispherical, aspherical, and asymmetrical lenses as desired, as well has ones have varying radiuses of curvature, diameters, spacings, and other size differences.

Figure 17:
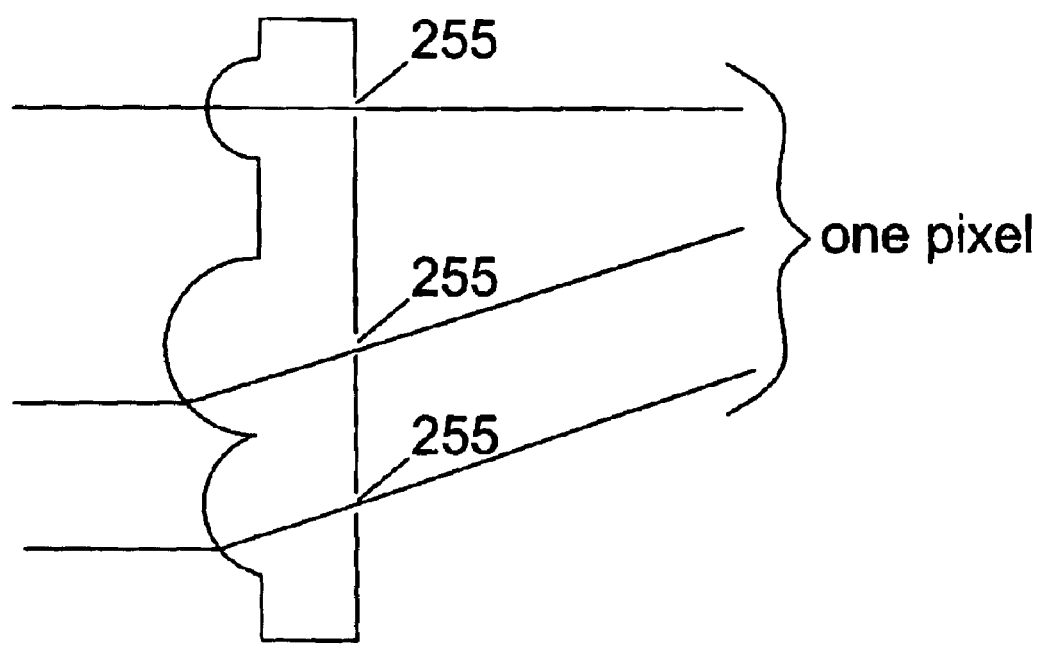
FIG. 17 is a diagram showing an aperture-to-pixel arrangement in accordance with one embodiment of the present invention.

In order to achieve a desired resolution, FIG. 17 shows that the screen may be fabricated so that light passing through a plurality of apertures 255 in the mask layer corresponds to one pixel in the screen. By altering the number of lenses per pixel, a desired screen resolution may be achieved which produces images of improved quality compared with conventional screens. Moreover, the number of lenses or apertures per pixel may be selected to achieve oversampling of the digital image being projected. This oversampling is preferably performed at or above the Nyquist rate so as to prevent aliasing effects in the resulting image. In accordance with one exemplary embodiment, oversampling is performed at 2 or 3 times the Nyquist rate. In a 10 times oversampling screen, 100 lenses would be provided per pixel.

In addition to or as an alternative to the aforementioned control techniques, screen resolution may be controlled by the size of the lenses. For digital image engines, spherical or hemispherical lenses with radii less than approximately 25 microns may be used. Also, lens size may be chosen to remove aliasing effects, and the lens array may be randomized to remove other types of image artifacts.

In rear-projection television or monitor applications, it may be desirable to direct some light at angles wider than the designed viewing angle of the screen. For example, although the rear projection screen may be designed to have a horizontal viewing angle of ±70 degrees, it may be desirable for the screen to direct some amount of light at angles greater than ±70 degrees, so that a viewer will be able to tell if the television or monitor is on when the viewer is positioned at angles greater than ±70 degrees. The amount of light directed at angles greater than the designed viewing angle only needs to be as much as is required to alert a viewer that the television or monitor is on. The individual lenses of the screen of the present invention may be configured, using the techniques described above, to achieve this result.

Figure 18:
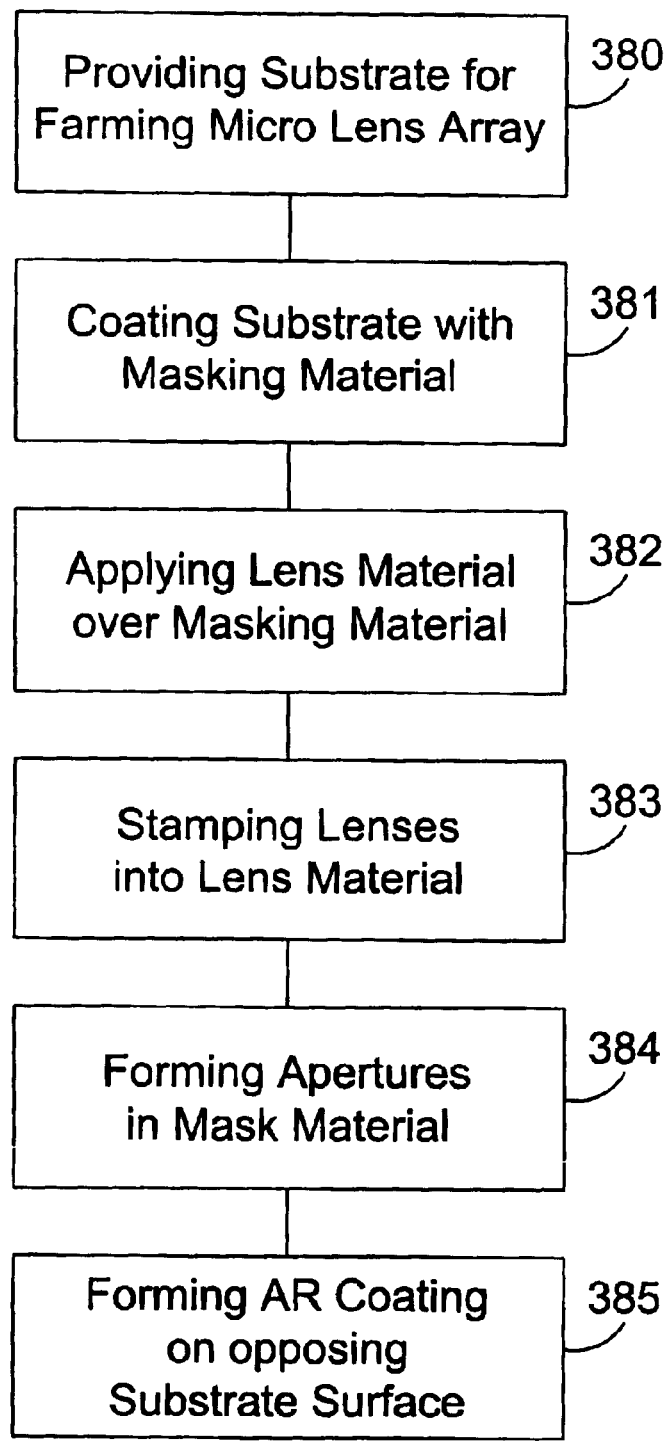
FIG. 18 is a flow diagram showing steps included in one embodiment of the method of the present invention for making a light-transmission screen.
Figure 19A:
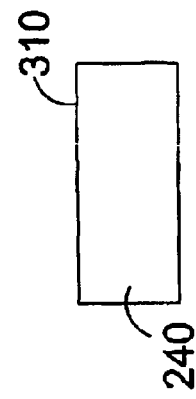
FIGS. 19a–e are diagrams showing results obtained at various steps of the method in FIG. 18.
Figure 19B:
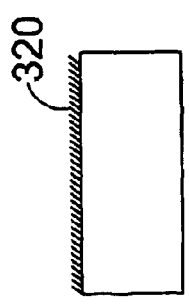
Figure 19C:
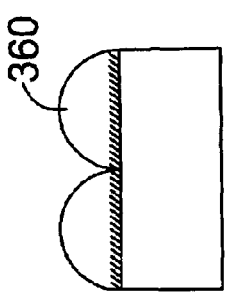
Figure 19D:
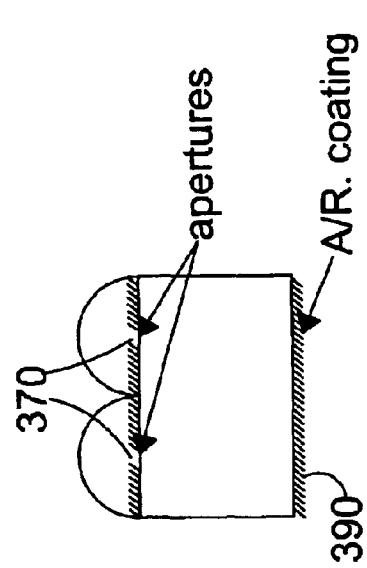
Figure 19E:
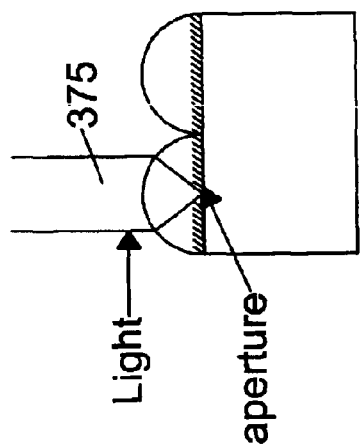

FIG. 18 is a flow diagram showing Steps included in a method for making a transmission screen as shown, for example, in FIG. 16. Accordingly, like reference numerals are used where applicable. Also, various stages of the method are shown in FIGS. 19a–e. The method includes as an initial step providing a substrate 240 made of, for example, a polycarbonate or acrylic plastic thick enough to provide a desired level of mechanical stability. (Block 380 and FIG. 19a).

A second step includes coating a first surface 310 of the substrate with a thin layer 320 of black masking material. (Block 381 and FIG. 19b). The thickness of this layer may vary with the material employed but an order of magnitude of 250 nm has been found to be preferable. Coating techniques include e-beam vacuum deposition, sputtering, chemical vapor deposition, as well as other film-deposition techniques.

A third step includes applying a material 360 from which the micro-lens array is to be replicated over the mask layer. (Block 382), This material may be, for example, a photopolymer epoxy, a polycarbonate, or PMMA or other resin. Material layer 360 is then patterned to form the individual lenses in the array. (Block 383 and FIG. 19c). This patterning step may be performed by any one of a variety of methods. For example, the patterning step may be performed in accordance with a stamping operation performed by a master which contains the lens pattern thereon. "Stamping", as used herein, broadly covers the process of forming shapes on a photopolymer, and curing the photopolymer material, and "stamper" broadly covers any tool used to form such shapes. Other methods, including embossing, may also be employed to pattern the material layer 360. By forming a pattern in this manner, two or more lenses in the array may be structurally varied in accordance with any of the techniques described herein in order to achieve a desired screen resolution or image quality, prevent aliasing, define a desired viewing range, etc.

A fourth step includes forming apertures 370 in the mask layer. (Block 384 FIG. 19e). This may be performed by directing pulsed laser radiation 375 (FIG. 19d) through the curved surface of the lens. The laser radiation is pulsed with an energy sufficient to form a hole of a desired width in the masking layer without damaging the other features of the lens or supporting substrate. Preferably, the laser is pulsed with an energy which is an order of magnitude of 10 mJ.

An optional fifth step includes forming an anti-reflective coating 390 on the opposing surface 395 of the substrate. (Block 385 and FIG. 19e).

Figure 20:
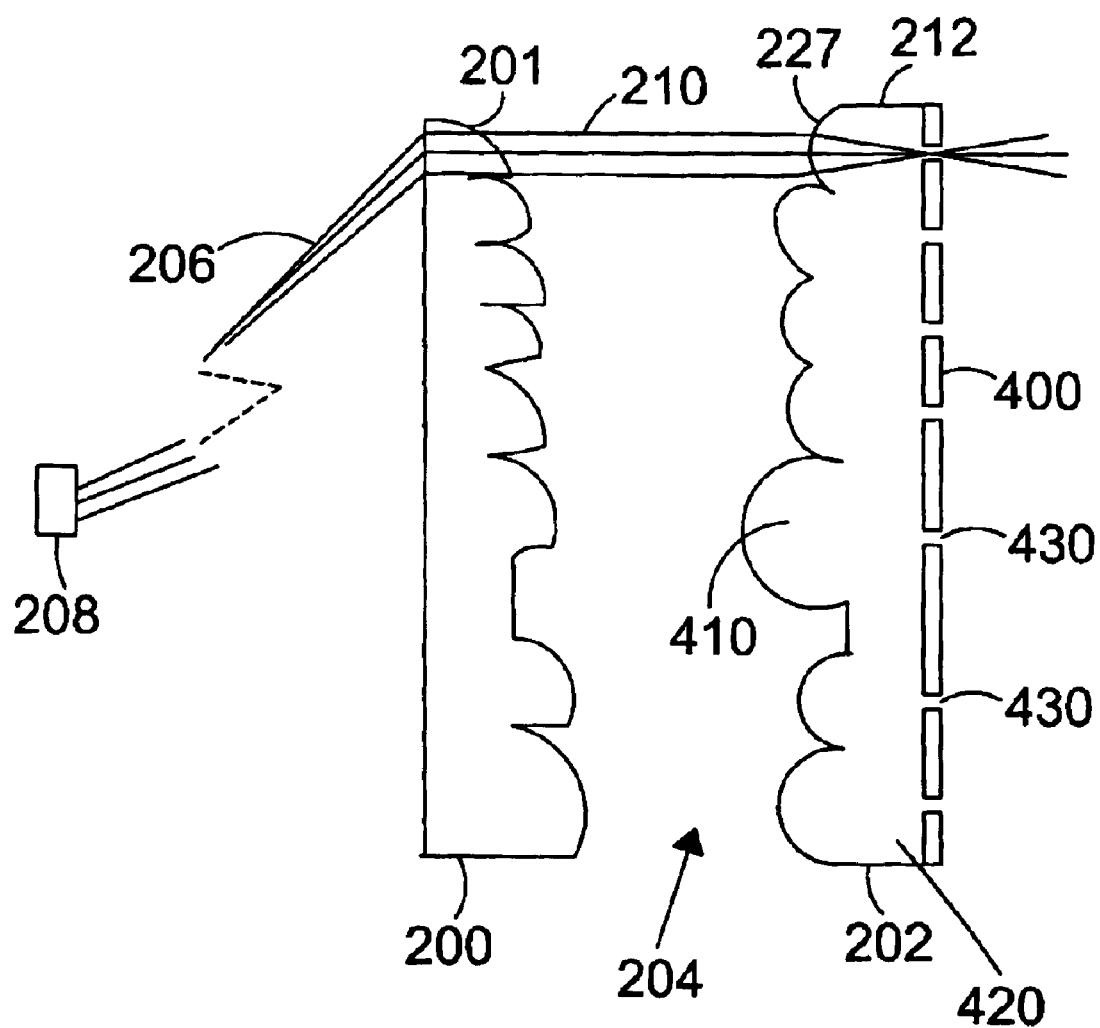
FIG. 20 is a diagram of another embodiment of a light-transmission screen in accordance with the present invention.

FIG. 20 shows a cross-sectional view of another transmission screen including a micro-lens array having any of the aforementioned structural variations. This screen is similar to the screen shown in FIG. 15 except that the mask layer 400 and lens array 410 are provided on opposite sides of the transparent substrate 420. Apertures 430 in the mask layer may be aligned as previously described to project light from one or more of the lenses.

Figure 21:
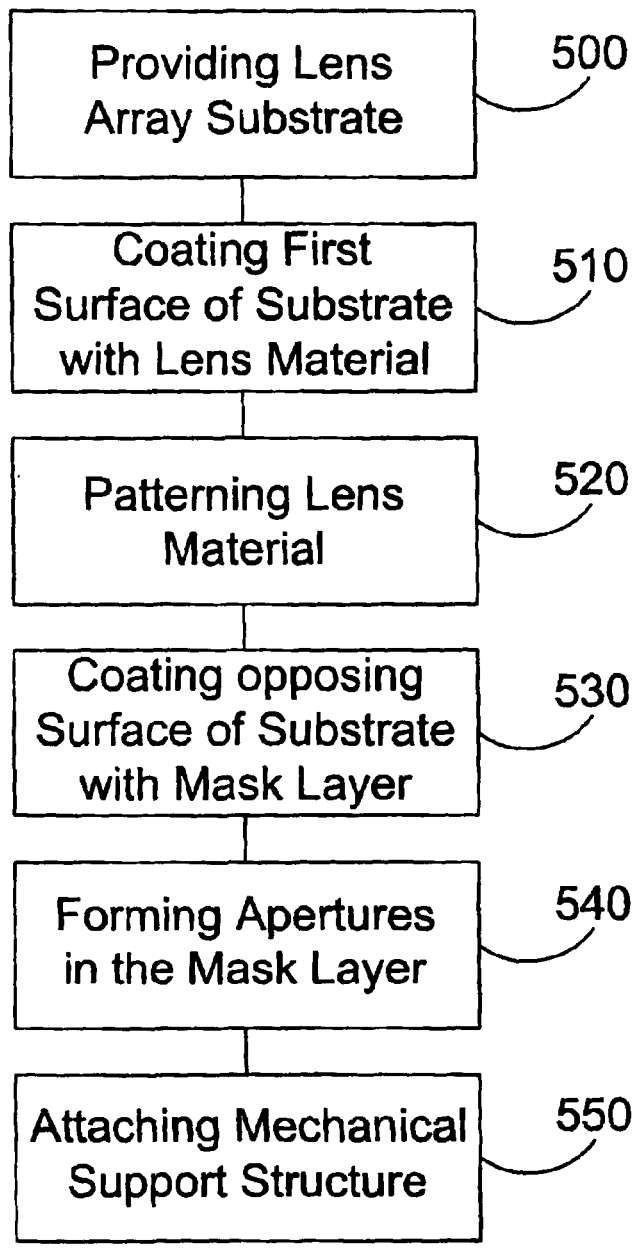
FIG. 21 is a flow diagram showing steps included in another embodiment of the method of the present invention for making a light transmission screen.
Figures 22A, 22B, 22C, 22D:
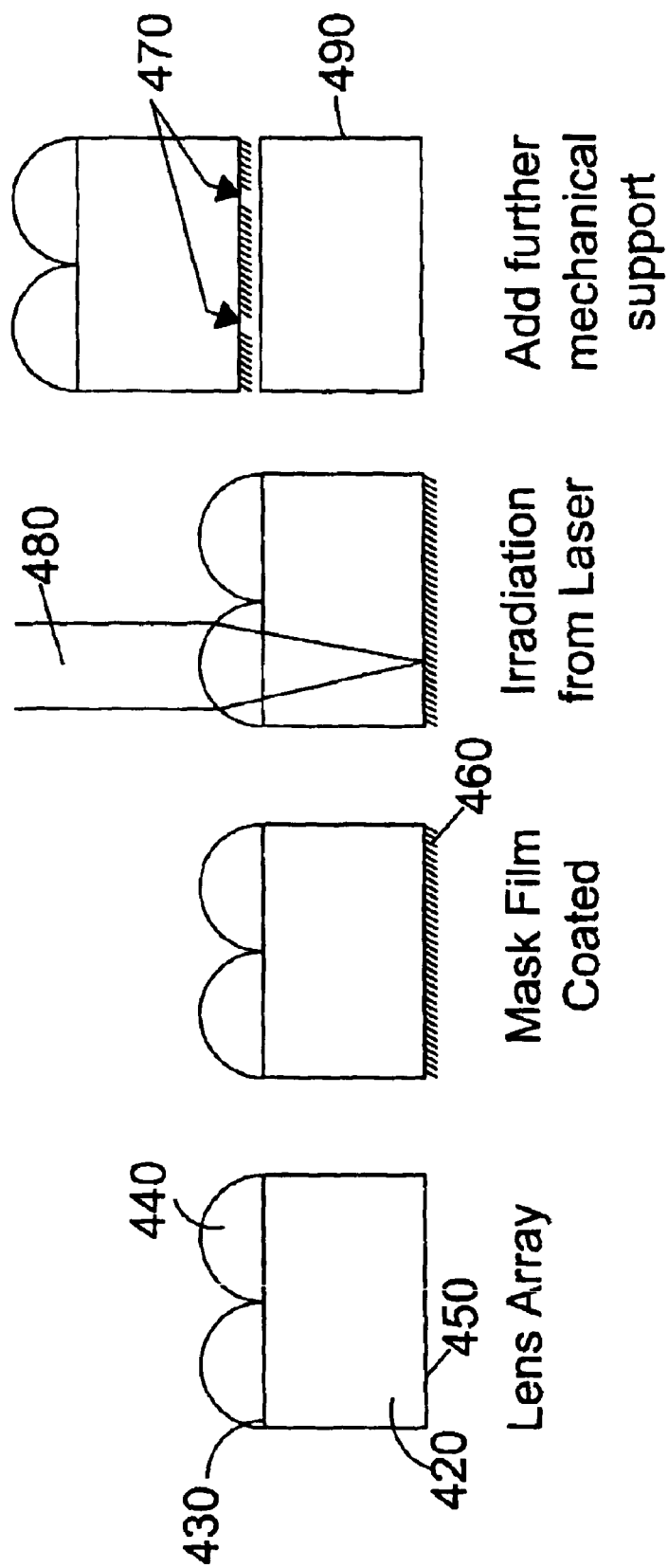
FIGS. 22a–d are diagrams showing results obtained at various steps of the method in FIG. 21.

FIG. 21 is a flow diagram showing steps included in a method for making a transmission screen as shown in FIG. 20. In this method, the mask layer 400 and lenses 410 are formed on opposing sides of the substrate 420. FIGS. 22a–d show results obtained at various stages of this method. An initial step of the method includes providing a substrate 420 made of, for example, a polycarbonate or acrylic plastic thick enough to provide a desired level of mechanical stability. (Block 500 and FIG. 22a).

A second step includes applying a material 440 from which the micro-lens array is to be replicated on a surface 430 of the transparent substrate. (Block 510). This material may be, for example, a photopolymer epoxy, a polycarbonate, or PMMA resin. Material layer 440 is then patterned to form the individual lenses in the array. (Block 520 and FIG. 22a). This patterning step may be performed by any one of a variety of methods. Preferably, the patterning step is performed in accordance with, stamping operation performed by a master which contains the lens pattern thereon. By forming a pattern in this manner, two or more lenses in the array may be structurally varied in accordance with any of the techniques described herein in order to achieve a desired screen resolution or image quality, prevent aliasing, define a desired viewing range etc.

A third step includes coating a second surface 450 of the substrate with a thin layer 460 of black masking material. (Block 530 aid FIG. 22b). The thickness of this layer may vary with the material employed but an order of magnitude of 250 nm has been found to be preferable. Coating techniques include e-beam vacuum deposition, sputtering, chemical vapor deposition, as well as other film-deposition techniques.

A fourth step includes forming apertures 470 in the mask layer. (Block 540 and FIG. 22*d*). This may be performed by directing pulsed laser radiation 480 (FIG. 22*c*) through the curved surface of the lens. The laser radiation is pulsed with an energy sufficient to form a hole of a desired width in the masking layer without, damaging the other features of the lens or supporting substrate. Preferably, the laser is pulsed with an energy which is an order of magnitude of 10 mJ.

An optional fifth step includes attaching a transparent layer 490 of polycarbonate or other material to the mask latter to provide mechanical stability to the lens screen. (Block 550 and FIG. 22*d*).

Figure 23:
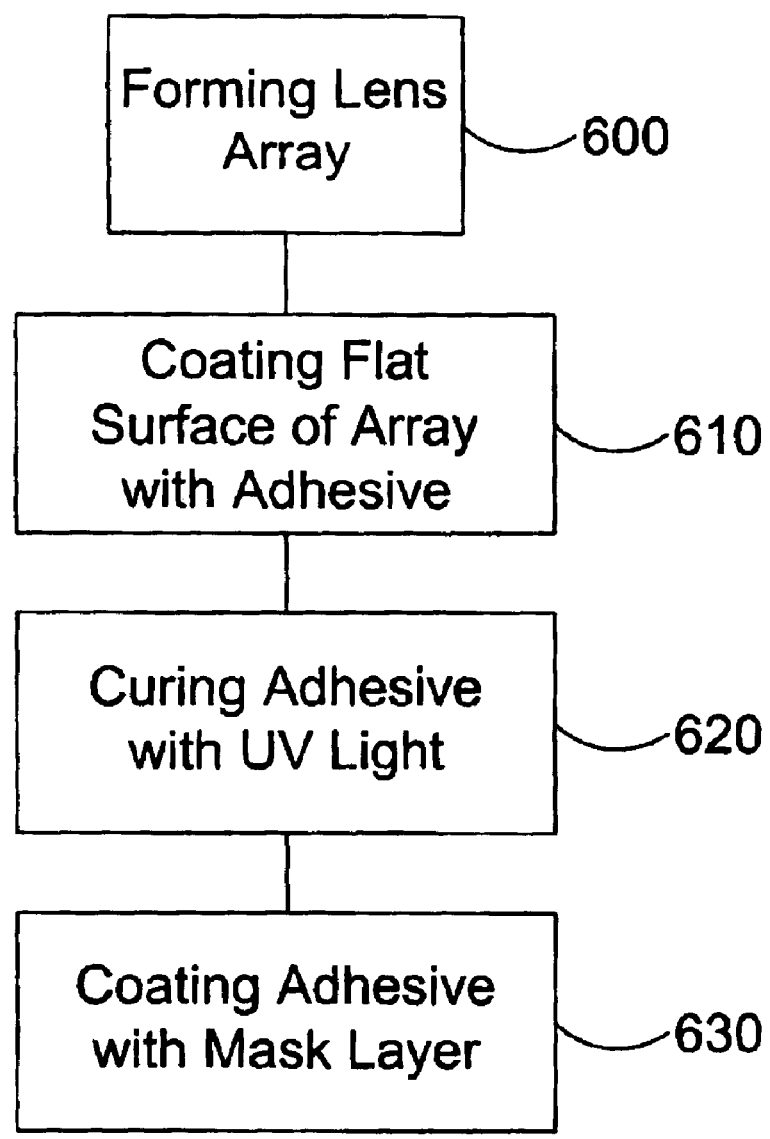
FIG. 23 is a flow diagram showing steps included in another embodiment of a method of the present invention for making a light-transmission screen.

FIG. 23 is a flow diagram showing steps included in another method for making a transmission screen as shown in FIG. 20, and FIGS. 24*a-d* show results obtained at various stages of this method. The method includes as an initial step forming a lens array 610 using a stamping operation. (Block 700 and FIG. 24*a*).

A second step includes coating an opposing surface 620 of the array with a photocurable adhesive 630 which, for example, may be UV curable. (Block 610 and FIG. 24*b*). The photocurable adhesive is preferably one whose adhesive properties are affected by exposure to UV light, suitably a photocurable adhesive that becomes non-adhesive when exposed to UV light.

A third step includes directing a beam of light 630 through the lens array. If a photocurable adhesive 630 is used that becomes non-adhesive upon exposure to light of a predetermined frequency and intensity, then the light beam has a frequency (e.g., UV light) and intensity sufficient to cause the portions of the adhesive layer which are exposed to the beam to become non-adhesive. (Block 620 and FIG. 24*c*).

A fourth step includes applying a layer 650 of black mask material over the adhesive layer. As a result of the third step, the mask material will adhere only to those places which have not been irradiated, thereby leaving apertures in the mask layer. (Block 630 and FIG. 24*d*).

In all the foregoing embodiments of the method of the present invention, a one-to-one correspondence has been shown between the lenses and apertures, i.e., each aperture is shown to emit a beam from only one of the respective lenses. In order to achieve enhanced screen resolution and/or to diminish the effects of aliasing or other image artifacts, the lenses and apertures may be formed so that each aperture emits light from multiple lenses.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

We claim:

1. A light-transmission screen, comprising:
    a lens array comprising a plurality of lenses for projecting light,
    wherein at least one hundred lenses are assigned to each pixel of an image so as to obtain a desired screen resolution.

2. The screen of claim 1, wherein a number of lenses assigned to provide light for each pixel in the screen is sufficient to reduce aliasing below visible thresholds in an image produced by the screen.

3. The screen of claim 1, further comprising a mask layer optically coupled to the lens array and positioned on a viewing side of the lens array, wherein the mask layer comprises a plurality of apertures.

4. The screen of claim 3, wherein the lens array is formed on a first side of a substrate.

5. The screen of claim 4, wherein the mask layer is coupled to a second side of the substrate opposite said first side.

6. The screen of claim 3, wherein the mask layer and the lens array are formed on a first side of a substrate.

7. The screen of claim 3, wherein each aperture in the mask layer is registered with a corresponding lens in the lens array.

8. The screen of claim 1, wherein the lenses in said array sample an image at a spatial frequency which reduces abasing below visible thresholds.

9. The screen of claim 1, wherein spacing between lenses in the lens array is randomized to reduce image artifacts.

10. The screen of claim 9, wherein the image artifacts comprise moire or partial coherence effects.

11. The screen of claim 1 wherein the plurality of lenses are less than approximately 25 microns in radius.

12. A light-transmission screen, comprising:
    a lens array comprising a plurality of lenses for projecting light,
    wherein at least two lenses are assigned to each pixel of an image so as to obtain a desired screen resolution; and
    wherein spacing between two adjacent lenses is less than approximately 105% of a diameter of one of the two adjacent lenses.

13. A light-transmission screen for displaying an image, comprising:
    a lens array comprising a plurality of lenses for projecting light;
    a mask layer, comprising a plurality of apertures, optically coupled to the lens array and positioned on a viewing side of the lens array, wherein each aperture is registered to a corresponding lens in the lens array and is adapted to pass light from its corresponding lens;
    wherein each pixel of the image is generated by light from at least one hundred lens/aperture combinations.

14. The screen of claim 13, wherein a number of lens/aperture combinations assigned to provide light for each pixel in the screen is sufficient to reduce aliasing below visible thresholds in an image produced by the screen.

15. The screen of claim 13, wherein a number of lens/aperture combinations assigned to provide light for each pixel in the screen is sufficient to obtain a desired screen resolution.

16. The screen of claim 13, wherein the lens array is formed on a first side of a substrate.

17. The screen of claim 16, wherein the mask layer is coupled to a second side of the substrate opposite said first side.

18. The screen of claim 13, wherein the mask layer and the lens array are formed on a first side of a substrate.

19. The screen of claim 13, wherein spacing between lenses in the lens array is randomized to reduce image artifacts.

20. The screen of claim 19, wherein the image artifacts comprise moire or partial coherence effects.

21. A rear projection display comprising the light-transmission screen of claim 13.

22. The screen of claim 13 wherein the plurality of lenses are less than approximately 25 microns in radius.

23. A light-transmission screen for displaying an image, comprising:
    a lens array comprising a plurality of lenses for projecting light;

a mask layer, comprising a plurality of apertures, optically coupled to the lens array and positioned on a viewing side of the lens array, wherein each aperture is registered to a corresponding lens in the lens array and is adapted to pass light from its corresponding lens;

wherein each pixel of the image is generated by light from at least two lens/aperture combinations; and wherein spacing between two adjacent lenses is less than approximately 105% of a diameter of one of the two adjacent lenses.

24. A light-transmission screen, comprising:

a lens array comprising a plurality of lenses for projecting light, wherein at least two lenses are assigned to each pixel of an image so as to oversample the image by at least ten times the Nyquist rate.

25. The screen of claim 24, wherein a number of lenses assigned to provide light for each pixel in the screen is sufficient to reduce aliasing below visible thresholds in an image produced by the screen.

26. The screen of claim 24, further comprising a mask layer optically coupled to the lens array and positioned on a viewing side of the lens array, wherein the mask layer comprises a plurality of apertures.

27. The screen of claim 26, wherein the lens array is formed on a first side of a substrate.

28. The screen of claim 27, wherein the mask layer is coupled to a second side of the substrate opposite said first side.

29. The screen of claim 26, wherein the mask layer and the lens array are formed on a first side of a substrate.

30. The screen of claim 26, wherein each aperture in the mask layer is registered with a corresponding lens in the lens array.

31. The screen of claim 24, wherein the lenses in said array sample an image at a spatial frequency which reduces aliasing below visible thresholds.

32. The screen of claim 24, wherein spacing between two adjacent lenses is less than approximately 105% of a diameter of one of the two adjacent lenses.

33. The screen of claim 24, wherein spacing between lenses in the lens array is randomized to reduce image artifacts.

34. The screen of claim 33, wherein the image artifacts comprise moire or partial coherence effects.

35. The screen of claim 24 wherein the plurality of lenses are less than approximately 25 microns in radius.

36. A light-transmission screen for displaying an image, comprising:

a lens array comprising a plurality of lenses for projecting light; and a mask layer, comprising a plurality of apertures, optically coupled to the lens array and positioned on a viewing side of the lens array, wherein each aperture is registered to a corresponding lens in the lens array and is adapted to pass light from its corresponding lens;

wherein each pixel of the image is generated by light from at least two lens/aperture combinations so as to oversample the image by at least ten times the Nyquist rate.

37. The screen of claim 36, wherein a number of lens/aperture combinations assigned to provide light for each pixel in the screen is sufficient to reduce aliasing below visible thresholds in an image produced by the screen.

38. The screen of claim 36, wherein a number of lens/aperture combinations assigned to provide light for each pixel in the screen is sufficient to obtain a desired screen resolution.

39. The screen of claim 36, wherein the lens array is formed on a first side of a substrate.

40. The screen of claim 39, wherein the mask layer is coupled to a second side of the substrate opposite said first side.

41. The screen of claim 36, wherein the mask layer and the lens array are formed on a first side of a substrate.

42. The screen of claim 36, wherein spacing between two adjacent lenses is less than approximately 105% of a diameter of one of the two adjacent lenses.

43. The screen of claim 36, wherein spacing between lenses in the lens array is randomized to reduce image artifacts.

44. The screen of claim 43, wherein the image artifacts comprise moire or partial coherence effects.

45. A rear projection display comprising the light-transmission screen of claim 36.

46. The screen of claim 36 wherein the plurality of lenses are less than approximately 25 microns in radius.

47. A light-transmission screen, comprising:

a lens array comprising a plurality of lenses for projecting light, wherein more than three lenses are assigned to each pixel of an image so as to obtain a desired screen resolution.

48. The screen of claim 47, wherein a number of lenses assigned to provide light for each pixel in the screen is sufficient to reduce aliasing below visible thresholds in an image produced by the screen.

49. The screen of claim 47, further comprising a mask layer optically coupled to the lens array and positioned on a viewing side of the lens array, wherein the mask layer comprises a plurality of apertures.

50. The screen of claim 49, wherein the lens array is formed on a first side of a substrate.

51. The screen of claim 50, wherein the mask layer is coupled to a second side of the substrate opposite said first side.

52. The screen of claim 49, wherein the mask layer and the lens array are formed on a first side of a substrate.

53. The screen of claim 49, wherein each aperture in the mask layer is registered with a corresponding lens in the lens array.

54. The screen of claim 47, wherein the lenses in said array sample an image at a spatial frequency which reduces aliasing below visible thresholds.

55. The screen of claim 47, wherein spacing between two adjacent lenses is less than approximately 105% of a diameter of one of the two adjacent lenses.

56. The screen of claim 47, wherein spacing between lenses in the lens array is randomized to reduce image artifacts.

57. The screen of claim 56, wherein the image artifacts comprise moire or partial coherence effects.

58. The screen of claim 47 wherein the plurality of lenses are less than approximately 25 microns in radius.

59. A light-transmission screen for displaying an image, comprising:

a lens array comprising a plurality of lenses for projecting light; and a mask layer, comprising a plurality of apertures, optically coupled to the lens array and positioned on a viewing side of the lens array, wherein each aperture is registered to a corresponding lens in the lens array and is adapted to pass light from its corresponding lens;

wherein each pixel of the image is generated by light from more than three lens/aperture combinations.

60. The screen of claim 59, wherein a number of lens/aperture combinations assigned to provide light for each pixel in the screen is sufficient to reduce aliasing below visible thresholds in an image produced by the screen.

61. The screen of claim 59, wherein a number of lens/aperture combinations assigned to provide light for each pixel in the screen is sufficient to obtain a desired screen resolution.

62. The screen of claim 59, wherein the lens array is formed on a first side of a substrate.

63. The screen of claim 62, wherein the mask layer is coupled to a second side of the substrate opposite said first side.

64. The screen of claim 59, wherein the mask layer and the lens array are formed on a first side of a substrate.

65. The screen of claim 59, wherein spacing between two adjacent lenses is less than approximately 105% of a diameter of one of the two adjacent lenses.

66. The screen of claim 59, wherein spacing between lenses in the lens array is randomized to reduce image artifacts.

67. The screen of claim 66, wherein the image artifacts comprise moire or partial coherence effects.

68. A rear projection display comprising the light-transmission screen of claim 59.

69. The screen of claim 59 wherein the plurality of lenses are less than approximately 25 microns in radius.

* * * * *